United States Patent [19]

Hanser et al.

[11] Patent Number: 5,180,249
[45] Date of Patent: Jan. 19, 1993

[54] THERMALLY STRESSED, TORSIONALLY RIGID CONNECTION

[75] Inventors: Hagen Hanser, München; Hubert Grieb, Germering, both of Fed. Rep. of Germany

[73] Assignee: MTU Motoren-Undturbinen-Union Munchen GmbH, Fed. Rep. of Germany

[21] Appl. No.: 683,815

[22] Filed: Apr. 11, 1991

[30] Foreign Application Priority Data

Apr. 14, 1990 [DE] Fed. Rep. of Germany ....... 4012211

[51] Int. Cl.⁵ ................................................. F16C 9/00
[52] U.S. Cl. ........................................ 403/28; 403/286; 403/273
[58] Field of Search .................. 403/28, 29, 30, 286, 403/273, 300

[56] References Cited

U.S. PATENT DOCUMENTS 4,281,941  8/1981  Rottenkolber .................... 403/29
4,836,750  6/1989  Modafferi et al. ................ 403/28 X
4,984,927  1/1991  Kojima et al. ..................... 403/30

*Primary Examiner*—Andrew V. Kundrat
*Attorney, Agent, or Firm*—Evenson, Wands, Edwards, Lenahan & McKeown

[57] ABSTRACT

A thermally stressed rotary connection of two coaxially aligned shafts includes two metallic coupling sleeves which are connected with the shafts by way of elastic intermediate layers. The two metallic sleeves engage one another. A ceramic centering sleeve is provided radially around the outside of the coupling sleeves and is shrunk onto the two shafts. The arrangement has the advantage of an effective connectability of different shafts such as ceramic or metal, in which case the two shafts may be connected with one another during the mounting. This allows undivided housings to be used.

18 Claims, 2 Drawing Sheets

THERMALLY STRESSED, TORSIONALLY RIGID CONNECTION

BACKGROUND AND SUMMARY OF THE INVENTION

The invention relates to a thermally and mechanically stressed, torsionally rigid connection of two coaxially aligned shafts.

Diverse fields of application are known in which two shafts, which are aligned coaxially with respect to one another, must be connected to one another, and wherein the connecting area is subjected to high temperatures. One such example is a gas turbine in which a first shaft, such as a turbine shaft, is manufactured of ceramic materials, while another shaft which is connected with the first shaft, such as a compressor shaft, is connected to a relatively cooler compressor.

However, applications are also possible in which two ceramic or two metallic shafts must be detachably connected with one another.

Further possible is a case in which a housing division must be avoided. In this case, a one-piece housing may be provided into which two shaft sections are inserted and are connected with one another to form a shaft.

There is therefore needed a connection of this type which can transmit high torque, permit a centering of the two shafts to be connected and, at the same time, may be subjected to high temperatures. In addition, it must be possible to transmit impact forces perpendicularly with respect to the axial direction and to connect shafts with one another which are made of different materials, such as shafts made of different types of ceramics.

The present invention meets these needs by providing a first shaft shoulder formed on an end of one of two coaxially aligned shafts. A second shaft shoulder is formed on an end of the other of the two coaxially aligned shafts with the first and second shaft shoulders being situated opposite one another. First and second elastic intermediate layers are formed on the first and second shaft shoulders, respectively. Two metallic coupling sleeves engage one another, one of the two metallic coupling sleeves being fastened to the one coaxially aligned shaft through the first intermediate layer and the other metallic coupling sleeve being fastened to the other coaxially aligned shaft through the second intermediate layer. A ceramic centering sleeve surrounds the two metallic coupling sleeves and is shrunk onto the two coaxially aligned shafts.

The present invention has the advantages of ensuring an easy centering of the two shafts to be connected even when the temperature is high. At the same time, a torque transmission takes place which is also suitable for impact stresses. An important advantage of the present invention provides for a rotor to be manufactured which comprises two shafts, in which case the two shafts may be connected to form a rotor by means of relatively simple manufacturing measures. As a result, high-cost housing divisions become unnecessary. An arrangement of this type is particularly suitable for turbo-supercharger or gas turbine rotors, where on the one hand a compressor rotor and, on the other hand a turbine rotor must be connected with one another. It is also advantageous that the connection according to the invention can be separated again should one of the two shafts be damaged.

In a preferred embodiment, the two shafts are made of ceramic materials, one shaft being connected with a compressor rotor, and the other shaft being connected with a turbine rotor, or representing the turbine rotor. Alternatively, it is also possible for one shaft to be constructed as an output shaft in order to guide the output from a low-pressure turbine to a power consumption device for example.

As a result of the torque transmission by means of the metallic coupling including two coupling sleeves which engage with one another and which are connected with the shafts by means of an elastic intermediate layer, a certain flexibility is obtained for bridging the expansion differences between the shaft parts and the coupling parts when individual components are acted upon by heat.

The elastic intermediate layer is preferably formed of a metallic fabric which consists of a highly nickel-containing heat-resistant wire cloth. In this case, the wires have a diameter of approximately 0.3 mm. The wires are arranged in a nondirectional manner in a cushion. The layer thickness of the metallic fabric amounts to approximately 3 mm. Inconel x-750, for example, may be used as the material.

The metallic fabric is soldered together with the coupling sleeve and the shaft using a high-temperature solder.

Preferably, the centering sleeve or bush consists of a material which has a lower thermal expansion coefficient than the shaft materials in order to cause a frictional engagement between the two components while the temperature is increased. This further ensures a secure centering of the two shafts. Such a material is preferably also a ceramic material. By means of the frictional engagement, a part of the torque is guided by way of the centering bush, whereby the stressing of the coupling sleeves is reduced. In this case, the thermal expansion coefficient of the centering bush preferably amounts to approximately 0.3 to 0.8 times that of the shafts. Particularly hot-pressed silicon nitride such as HPSN NC 132, is suitable as the material of the centering bush. A slight press fit of approximately 2 to 4 $\mu$m is used as the press fit.

Hot-pressed silicon nitride (HPSN), such as CERANOX 206, may be used as the shaft material. A possible alternative is silicon carbide (. . . —SiC) which is less expensive but more sensitive to thermal shock.

However, the invention has broad application to any ceramic or metallic materials forming the shafts, in which case only the elastic intermediate layer must be fixable. The elastic intermediate layers between the shafts, on the one hand, and the coupling sleeves, on the other hand, preferably consist of a metallic fabric or a metallic felt.

Another embodiment according to the present invention provides at least two essentially radial openings in one or in both coupling sleeves so that the axial gap remaining between the two shafts is connected with the exterior space and thus a flow-through of cooling air may be provided. This construction is suitable for reducing the temperature gradients occurring in the shaft.

Other objects, advantages and novel features of the present invention will become apparent from the following detailed description of the invention when considered in conjunction with the accompanying drawings.

DETAILED DESCRIPTION OF THE DRAWINGS

Figure 1:
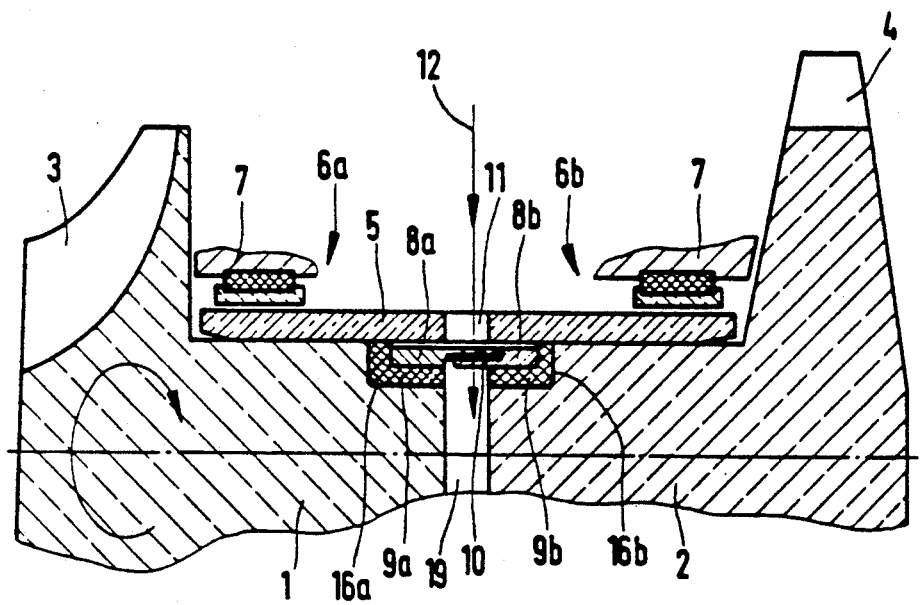
FIG. 1 is an axial sectional view of two shafts which are connected with one another.

FIG. 1 shows two coaxially aligned shafts 1 and 2 which are both manufactured of ceramic materials. Shaft 1 is assigned to a radial-flow compressor 3, while shaft 2 is connected with an axial-flow turbine 4. A centering bush 5 is shrunk onto the two shafts 1 and 2 by means of press fits. On the one hand, the bush 5 takes over the centering of the two shafts 1 and 2 and, also by way of the press fit, absorbs and transfers part of the torque from shaft 1 to shaft 2. The centering bush 5 also takes over the axial securing of the two shafts 1 and 2 because of the press fits.

On the centering bush 5, two bearings 6a and 6b are arranged by means of which the whole rotor, which includes shafts 1 and 2, is supported on the housing 7. The bearings 6a and 6b are preferably constructed as air-lubricated slide bearings which are pushed onto the centering bush 5 before the mounting of the rotor. The bearings 6a and 6b have bearing shells made of a ceramic construction and are supported on the housing side by means of metallic felt or wire cloths.

On the shaft 1, a coupling sleeve 8a is mounted by way of an elastic intermediate layer 9a. The elastic intermediate layer 9a is constructed as a metallic fabric which is soldered together with the ceramic shaft 1 and with the metallic coupling sleeve 8a. In this case, the coupling sleeve 8a has a slightly smaller outer diameter than the shaft 1. For this purpose, the elastic intermediate layer 9a is mounted, on a shaft shoulder 16a of shaft 1. In the same manner, a coupling sleeve 8b, which engages with the other coupling sleeve 8a by way of a toothing 10 is mounted on shaft 2 or its shaft shoulder 16b via an elastic intermediate layer 9b. In this case, the toothing 10 may be constructed as a spline so that a good torque transmission is possible from the one shaft 2 to the other shaft 1. By means of this toothing 10, the two coupling sleeves 8a and 8b can be detachably connected by axial insertion.

In this case, the elastic intermediate layers 9a and 9b have a thickness of approximately 3 mm. The metallic fabric used consists of a heat-resistant, highly nickel-containing wire cloth which is arranged in nondirectional wire layers.

In the centering sleeve 5, several radially or diagonally aligned bores 11 distributed over the circumference are provided. These bores 11 are used for supplying cooling air indicated by means of the arrow 12 from radially outside. After passing through the bores 11, the air either flows through additional bores in the coupling sleeves 8a and 8b or it flows axially through the gaps between the teeth of the toothing 10.

Figure 2:
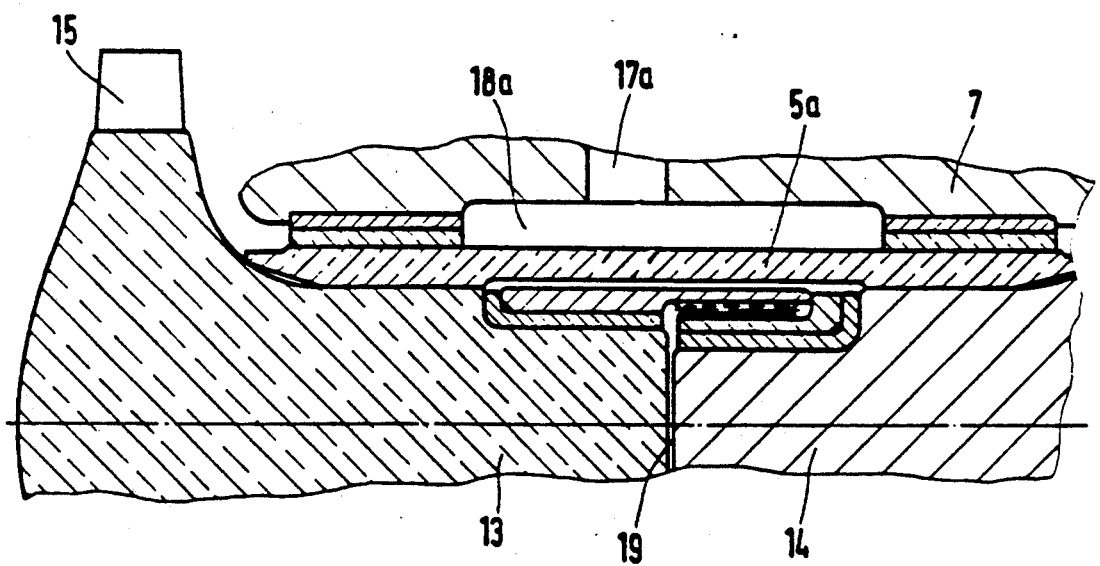
FIG. 2 is an axial sectional view of two other connected shafts.

FIG. 2 shows an embodiment of the invention which connects a ceramic shaft 13 with a metallic shaft 14. In this case, the ceramic shaft 13 is assigned to a low-pressure turbine 15 while the metallic shaft 14 serves as an output shaft. The embodiment corresponds essentially to that illustrated in FIG. 1 with the exception that no axial gap must be provided between the shafts 13 and 14 because of the relatively low temperature gradient in the area of the low-pressure turbine 15. Thus in addition, the centering sleeve 5a must also not have radial bores which feed cooling air.

Figure 3:
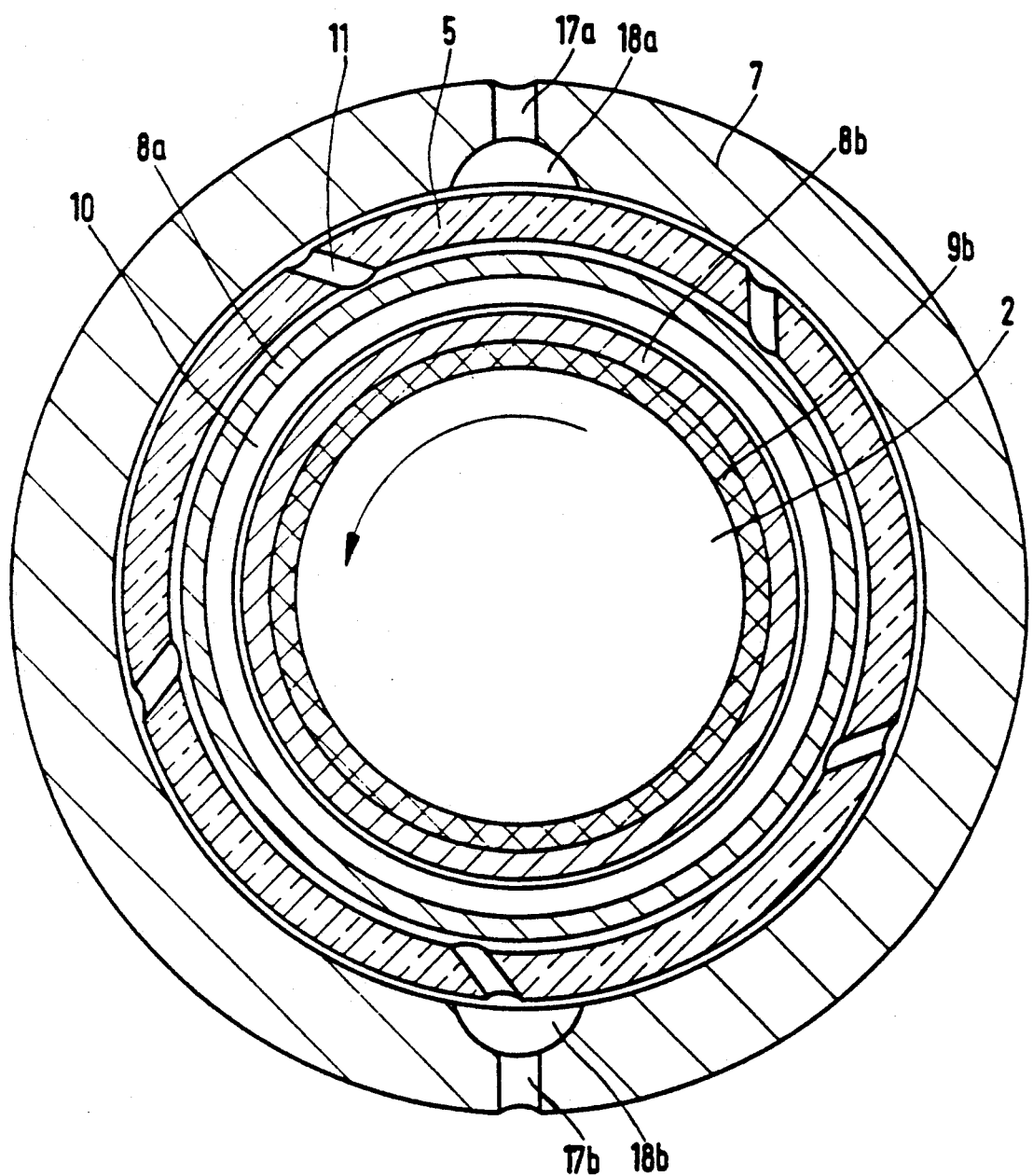
FIG. 3 is a cross-sectional view of the end section of a shaft.

FIG. 3 is a cross-sectional view of the area between the two shafts 1 and 2. By way of the elastic intermediate layer 9b, the coupling sleeve 8b is mounted on shaft 2. The coupling sleeve 8a fastened to shaft 1 engages with the coupling sleeve 8b by way of the toothing 10. Radially outside this outer coupling sleeve 8a, the centering bush 5 is arranged. Four diagonally aligned bores 11 are distributed over the circumference of the bush 5. The bores are angled approximately 10°-30° and are let into the centering bush 5. In the housing 7, two ducts 17a and 17b are provided (see FIG. 2) which are used for the supply and removal of cooling air. In this case, the air flows from duct 17a into the antechamber 18a, and from there by way of the bores 11 and the gaps in the toothing 10 into the gap between the shafts 1 and 2 (FIG. 1 and 2). In turn, the air flows out again via the bores 11 into the antechamber 18b, and from there into the duct 17b. The end faces of the shafts 1 and 2 are cooled in this manner.

The antechambers 18a and 18b extend in the axial direction from one bearing 6a to the other bearing 6b. A portion of the air supplied by way of the duct 18a may be preferably branched off for acting upon the air bearings 6a and 6b.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A thermally and mechanically stressed, torsional rigid connection between two coaxially aligned shafts, comprising:
   a first shaft shoulder formed on an end of one of said two coaxially aligned shafts,
   a second shaft shoulder formed on an end of the other of said two coaxially aligned shafts, said first and second shaft shoulders being situated opposite one another;
   first and second elastic intermediate layers formed on said first and second shaft shoulders, respectively;
   two metallic coupling sleeves engaging one another, one of said two metallic coupling sleeves being fastened to said one coaxially aligned shaft through said first intermediate layer and the other metallic coupling sleeve being fastened to said other coaxially aligned shaft through said second intermediate layer; and
   a ceramic centering sleeve surrounding said two metallic coupling sleeves and shrunk onto said two coaxially aligned shafts.

2. A connection according to claim 1, wherein at least one of said two coaxially aligned shafts are composed of ceramic materials.

3. A connection according to claim 1, wherein said one shaft is a shaft end of a molded-on ceramic turbine rotor.

4. A connection according to claim 3, wherein said other shaft is an output shaft.

5. A connection according to claim 1, wherein said two metallic coupling sleeves are form-lockingly arranged in a manner to extend axially with one another.

6. A connection according to claim 2, wherein said two metallic coupling sleeves are form-lockingly arranged in a manner to extend axially with one another.

7. A connection according to claim 1, wherein said centering sleeve is composed of a material having a lower thermal expansion coefficient than the materials of said two coaxially aligned shafts.

8. A connection according to claim 2, wherein said centering sleeve is composed of a material having a lower thermal expansion coefficient than the materials of said two coaxially aligned shafts.

9. A connection according to claim 5, wherein said centering sleeve is composed of a material having a lower thermal expansion coefficient than the materials of said two coaxially aligned shafts.

10. A connection according to claim 1, wherein the thermal expansion coefficient of said centering sleeve is approximately 0.3 to 0.8 times the thermal expansion coefficient of said two coaxially aligned shafts.

11. A connection according to claim 1, further comprising:
two air bearings arranged on said centering sleeve supported by a housing, said two air bearings supporting said centering sleeve at its end areas.

12. A connection according to claim 11, wherein said two air bearings have bearing shells formed of a ceramic construction and further including metallic felt means for supporting said bearing shells on the housing side.

13. A connection according to claim 11, wherein said two air bearings have bearing shells formed of a ceramic construction and further including wire cloth means for supporting said bearing shells on the housing side.

14. A connection according to claim 1, wherein said elastic intermediate layers are composed of metallic fabric between said sleeves.

15. A connection according to claim 1, wherein said elastic intermediate layers are composed of metallic felt between said two coaxially aligned shafts and said two metallic coupling sleeves.

16. A connection according to claim 1, wherein at least two essentially radial bores are provided in said centering sleeve allowing cooling air to flow through.

17. A connection according to claim 1, wherein said centering sleeve is used for axially securing said two coaxially aligned shafts.

18. A connection according to claim 7, wherein said centering sleeve is used for axially securing said two coaxially aligned shafts.

* * * * *